Patented Aug. 14, 1945

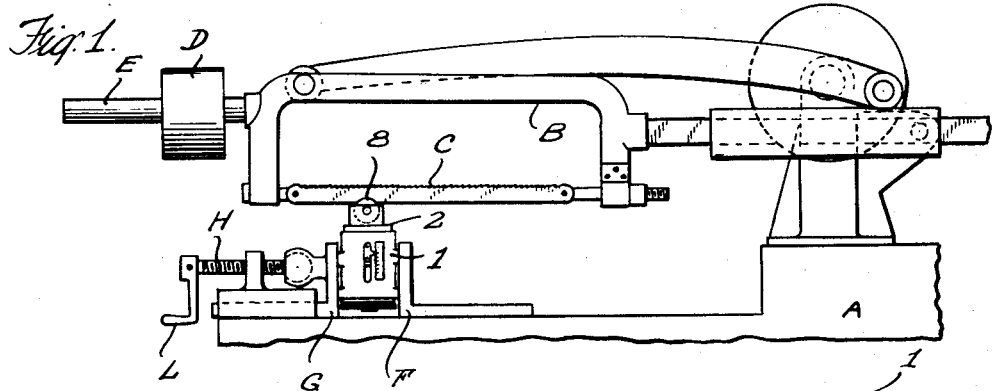
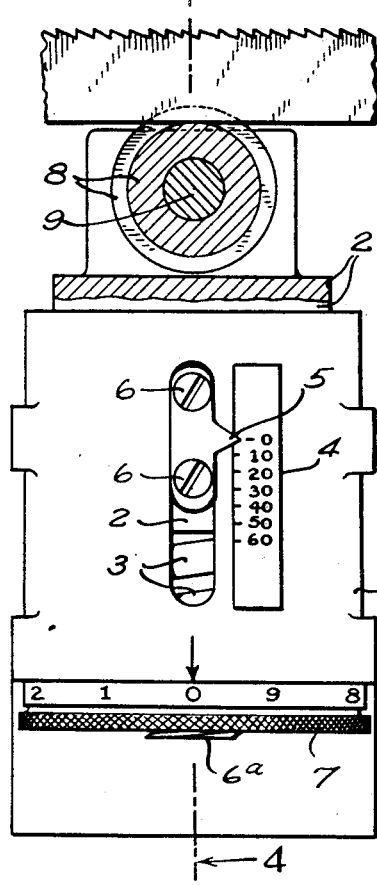
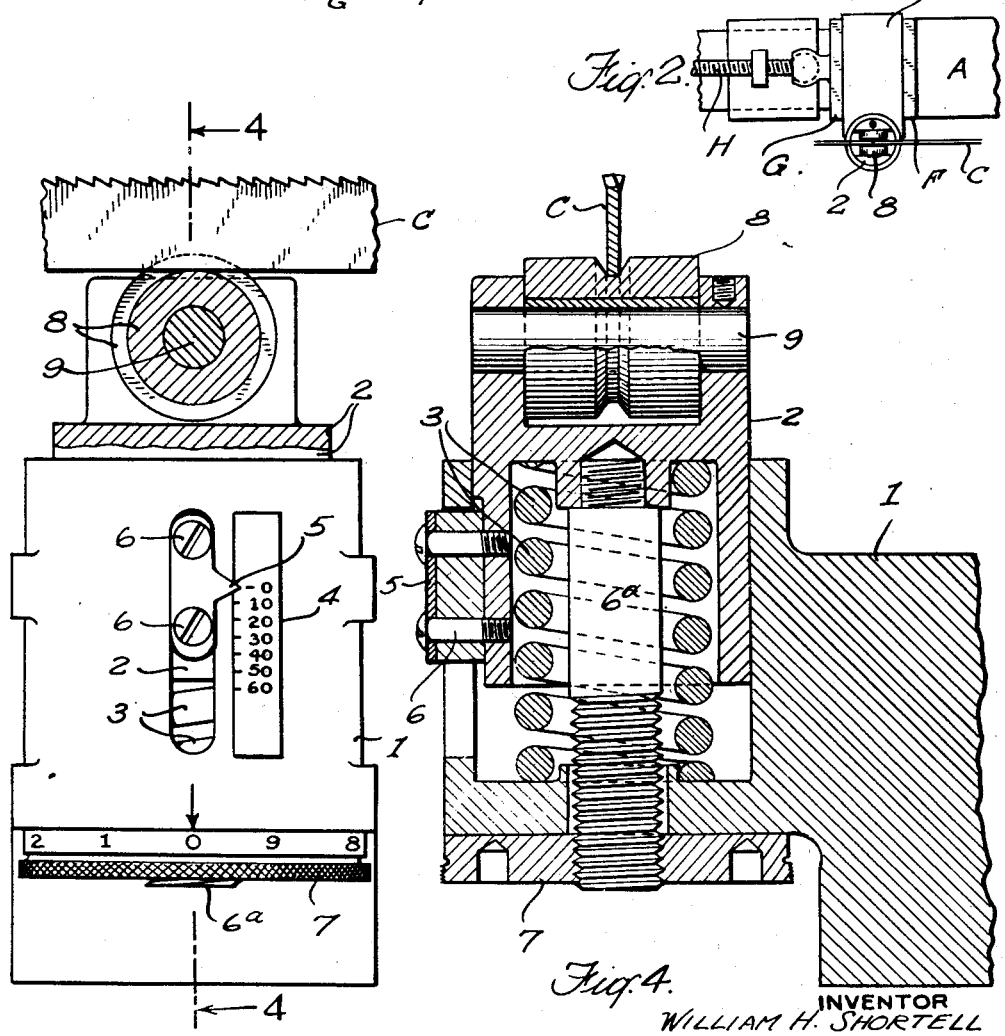

2,381,988

UNITED STATES PATENT OFFICE 2,381,988

PRESSURE INDICATOR FOR HACK SAWS

William H. Shortell, Greenfield, Mass., assignor to Millers Falls Company, Greenfield, Mass., a corporation of Massachusetts Application March 28, 1944, Serial No. 528,391

6 Claims. (Cl. 29—73)

This invention has to do with a pressure indicator for hack saws and its object is to provide a means for measuring the working pressure exerted by the hack saw on the material being cut at various settings of the feed mechanism of the hack saw machine.

Other objects of the invention will in part be obvious and will in part appear hereinafter.

The invention accordingly comprises the features of construction, combinations of elements, and arrangement of parts, which will be exemplified in the constructions hereinafter set forth, and the scope of the application of which will be indicated in the claims.

For a fuller understanding of the nature and objects of the invention reference should be had to the following detailed description taken in connection with the accompanying drawing, in which:

Fig. 1 shows the pressure indicator mounted in the clamping vise of a hack saw machine with the means for adjusting the working pressure of the hack saw blade upon the work and for applying power for the reciprocating working movement of the blade shown conventionally;

Fig. 2 is a detail showing in top plan the relation of the pressure indicator to the saw machine vise;

Fig. 3 is a view in end plan partly in section of the pressure indicator showing the two scaling devices used to register the pressure of the hack saw blade at any given setting of the feeding mechanism; and Fig. 4 is a vertical section on the line 4—4 of Fig. 3.

The base of the hack saw machine is indicated at A. This base carries the reciprocating frame B, with the hack saw blade C mounted therein. One end of this blade frame carries a weight D adjustable on a stud E projecting from the frame B. This is a conventional illustration of means for adjusting the pressure upon a hack saw blade by moving the weight D along the stud E.

The base of the machine carries the usual vise as indicated having a fixed jaw F and an opposing reciprocatable jaw G operated by a threaded pusher H and handle L.

The pressure indicator which forms the subject of this invention is located within the vise as shown in Figs. 1 and 2, and it comprises a frame 1 adapted to be locked between the jaws of the vise. This frame 1 carries a vertically reciprocating plunger 2, the vertical position of which is controlled by a coil spring 3 interposed between the plunger 2 and the frame 1. The outer face of the frame 1, shown in Fig. 3, carries a fixed scale 4 reading from zero to sixty and indicating tenths of an inch of travel of the plunger 2. The plunger carries a pointer 5 connected thereto by screws 6 and traveling therewith along scale 4.

Carried with the plunger 2 is a stud 6a having its lower end screw-threaded and carrying on this lower threaded end a graduated nut 7.

The graduations on the scale 4 read in tenths of an inch and coincide with the pitch of the nut which has ten threads per inch, and also ten graduations. It follows that each graduation of the nut represents a spring compression of one hundredth of an inch. The upper end of the plunger 2 carries a grooved roller 8 shown as mounted loosely upon a journal pin 9.

The operation of this pressure indicator may now be readily understood. The frame 1 of the indicator is clamped in the vise of the saw machine in a position to lock the groove in the roller 8 directly under the saw blade which is turned so that the teeth will be on top and the smooth back of the saw on the bottom, where it will contact the roller groove when the feed pressure is applied. If for any reason it is not desired to use a saw blade for this purpose, as when a double edged blade is normally used in the machine, a discarded single edged blade may be used or any form of dummy blade.

The saw machine is now put into operation and the application of the feed pressure then compresses the spring 3 and carries down the plunger 2. This leaves a space between the graduated nut 7 and the frame 1.

The graduated nut 7 is then turned up with the fingers until this space is taken up.

At this point, the graduations on the scale 4 and on the graduated nut may be read. Those on the main scale represent tenths of an inch which coincides with the pitch of the nut. The nut has ten threads per inch and ten graduations. Each graduation of the nut accordingly represents a spring compression of one hundredth of an inch. The main scale accordingly gives readings in tenths and the graduated nut in hundredths of an inch.

The spring 3 used is calibrated and a chart made out showing the values in pounds for each graduation. Accordingly, the reading of the indicator may be converted into pounds by referring to this chart.

This pressure indicator is especially adapted for use in connection with a hack saw chart, recommending optimum feed pressures under various working conditions upon various materials, and by the use of this pressure indicator the correct pressure may be readily obtained for any desired material under the conditions of each job.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described my invention, what I claim as new and desire to secure by Letters Patent is:

1. In combination with a hack saw machine equipped with means for varying the pressure of the hack saw blade, a plunger adapted to be held in position under the hack saw blade and readily removable therefrom, a spring acting upon said plunger in opposition to the blade pressure, and a scale indicating the travel of said plunger when exposed to the pressure of said blade.

2. In combination with a hack saw machine equipped with means for varying the pressure of the hack saw blade, a plunger adapted to be held in position under the hack saw blade and readily removable therefrom, a calibrated spring acting upon said plunger in opposition to the blade pressure, and a scale indicating the travel of said plunger when exposed to the pressure of said blade.

3. In combination with a hack saw machine equipped with means for varying the pressure of the hack saw blade, a plunger adapted to be held in position under the hack saw blade and readily removable therefrom, a calibrated spring acting upon said plunger in opposition to the blade pressure, a scale indicating the travel of such plunger reading in major fractions of an inch, and a second scale reading in minor fractions of an inch.

4. In combination with a hack saw machine equipped with means for varying the pressure of the hack saw blade, a plunger adapted to be clamped in the work vise of the machine and readily removable therefrom, a calibrated spring acting upon said plunger in opposition to the blade pressure, and a scale indicating the travel of said plunger when exposed to the pressure of said blade.

5. In combination with a hack saw machine equipped with means for varying the pressure of the hack saw blade, a plunger adapted to be held in position under the hack saw blade and readily removable therefrom, a calibrated spring acting upon said plunger in opposition to the blade pressure, a scale associated with said plunger, a pointer carried by said plunger traveling over said scale, a threaded stud carried by said plunger, a nut threaded on the lower end of said stud, and graduations upon said nut corresponding to the number of threads of said nut.

6. In combination with a hack saw machine equipped with means for varying the pressure of the hack saw blade, a plunger adapted to be held in position under the hack saw blade and readily removable therefrom, a calibrated spring acting upon said plunger in opposition to the blade pressure, a scale associated with said plunger, a pointer carried by said plunger traveling over said scale, a threaded stud carried by said plunger, a nut threaded on the lower end of said stud, graduations upon said nut corresponding to the number of threads of said nut, and a grooved roller journaled in the upper end of said plunger.

WILLIAM H. SHORTELL.